`US008221543B2`

United States Patent
Schürch et al.

(10) Patent No.: US 8,221,543 B2
(45) Date of Patent: Jul. 17, 2012

(54) SOLIDIFICATION AND HARDENING ACCELERATOR FOR HYDRAULIC BINDERS AND PROCESS FOR ITS PREPARATION

(75) Inventors: Heinz Schürch, Unterengstringen (CH); Franz Wombacher, Jonen (CH); Benedikt Lindlar, Constance (DE); Didier Lootens, Zurich (CH); Robert Flatt, Feldmeilen (CH)

(73) Assignee: Sika Technology AG, Baar (CH)

( * ) Notice: Subject to any disclaimer, the term of this patent is extended or adjusted under 35 U.S.C. 154(b) by 226 days.

(21) Appl. No.: 12/449,471

(22) PCT Filed: Feb. 13, 2008

(86) PCT No.: PCT/EP2008/051742
§ 371 (c)(1),
(2), (4) Date: Aug. 12, 2009

(87) PCT Pub. No.: WO2008/098961
PCT Pub. Date: Aug. 21, 2008

(65) Prior Publication Data
US 2010/0018440 A1    Jan. 28, 2010

(30) Foreign Application Priority Data

Feb. 13, 2007   (EP) .................... 07102295

(51) Int. Cl.
| C04B 14/48 | (2006.01) |
| C04B 16/00 | (2006.01) |
| C04B 22/04 | (2006.01) |
| C04B 14/00 | (2006.01) |
| C04B 24/00 | (2006.01) |
| C04B 9/00  | (2006.01) |
| C04B 28/30 | (2006.01) |
| C04B 7/00  | (2006.01) |
| C04B 40/00 | (2006.01) |

(52) U.S. Cl. ........ 106/810; 106/823; 106/801; 106/640; 106/724; 106/727

(58) Field of Classification Search .................. 106/810, 106/823, 724, 727, 640, 801
See application file for complete search history.

(56) References Cited

U.S. PATENT DOCUMENTS

| 6,423,133 | B1 | 7/2002 | Touzet et al. | |
| 2010/0003412 | A1* | 1/2010 | Weibel | .......... 427/337 |
| 2010/0071595 | A1* | 3/2010 | Lindlar et al. | .......... 106/640 |

FOREIGN PATENT DOCUMENTS

| WO | 0 076 927 A1 | 4/1983 |
| WO | 0 946 451 B1 | 9/2000 |
| WO | WO 00/78688 A1 | 12/2000 |
| WO | 0 812 812 B1 | 1/2003 |
| WO | WO 03/029163 A2 | 4/2003 |
| WO | WO 03/106375 A1 | 12/2003 |
| WO | WO 2005/040059 A2 | 5/2005 |
| WO | WO 2005040059 A2 * | 5/2005 |
| WO | WO 2005/075381 A1 | 8/2005 |
| WO | WO 2005075381 A1 * | 8/2005 |
| WO | WO 2006/010407 A1 | 2/2006 |
| WO | WO 2006010407 A1 * | 2/2006 |

OTHER PUBLICATIONS

"Condensed Silica Fume". Sep. 10, 2006 [Retrieved on Aug. 5, 2011]. Retrieved from http://wayback.archive.org/web/*/http://www.engr.psu.edu/ce/courses/ce584/concrete/library/materials/Altmaterials/Silice/%20Fume.htm.*

* cited by examiner

*Primary Examiner* — Anthony J Green
*Assistant Examiner* — Karam Hijji
(74) *Attorney, Agent, or Firm* — Oliff & Berridge, PLC

(57) ABSTRACT

The present invention relates to a fluoride-free solidification and hardening accelerator for hydraulic binders, comprising sulfate, aluminum and organic acid, the molar ratio of aluminum to sulfate being less than 0.83.

14 Claims, No Drawings

SOLIDIFICATION AND HARDENING ACCELERATOR FOR HYDRAULIC BINDERS AND PROCESS FOR ITS PREPARATION

FIELD OF THE INVENTION

The invention relates to a solidification and hardening accelerator for hydraulic binders, a process for the preparation of a solidification and hardening accelerator for hydraulic binders and the use of the solidification and hardening accelerator in an air-placed concrete or pneumatically applied mortar.

PRIOR ART

There are many known substances which accelerate the solidification and hardening of concrete. For example, strongly alkaline substances, such as alkali metal hydroxides, alkali metal carbonates, alkali metal silicates, alkali metal aluminates and alkaline earth metal chlorides, are customary. The strongly alkaline substances, however, may give rise to undesired annoyances for the processor, such as burns, and they reduce the final strength and durability of the concrete.

EP 0 076 927 B1 discloses alkali-free solidification accelerators for hydraulic binders, which accelerators are said to avoid these disadvantages. For accelerating the solidification and hardening of a hydraulic binder, such as cement, lime, hydraulic lime and gypsum, and mortar and concrete produced therefrom, from 0.5 to 10% by weight, based on the weight of this binder, of an alkali-free solidification and hardening accelerator are added to the mixture which contains said binder, this accelerator containing aluminum hydroxide.

As a result of the accelerated solidification and hardening, such mortars and concretes are particularly suitable as pneumatically applied mortar and air-placed concrete.

EP 0 946 451 B1 discloses solidification and hardening accelerators in dissolved form for hydraulic binders, which accelerators can be more easily mixed with the concrete during the spraying of the concrete. Such a solidification and hardening accelerator comprises, inter alia, aluminum hydroxide, aluminum salts and organic carboxylic acids.

WO 03/106375 A1 discloses solidification and hardening accelerators which contain at least aluminum sulfate, alkanolamine and hydrofluoric acid.

WO 2005/075381 A1 describes a solidification and hardening accelerator comprising aluminum hydroxide, aluminum sulfate and organic acid, the accelerator having a molar ratio of aluminum to organic acid of less than 0.65 and a molar ratio of aluminum to sulfate of greater than 0.83.

WO 00/78688A discloses an admixture for accelerating air-placed concrete, the admixture comprising the reaction product of aluminum hydroxide and an organic acid, and aluminum sulfate and at least one alkanolamine. The admixture preferably contains 16-18% by weight of aluminum hydroxide and contains no magnesium salt.

For the preparation, such known accelerators require a relatively large amount of amorphous aluminum hydroxide, which is very expensive. Moreover, a relatively large amount of organic carboxylic acids is required in such accelerators in order to stabilize the accelerator sufficiently. In addition, the use of fluoride-containing compounds, such as, for example, hydrofluoric acid, can be harmful to health and the environment and is therefore undesired. Further disadvantages of such solidification and hardening accelerators are moreover a relatively low early strength in the first hours and days and the insufficient stability of the solution.

SUMMARY OF THE INVENTION

It is the object of the invention, in the case of a solidification and hardening accelerator for hydraulic binders of the type mentioned at the outset, to achieve an accelerator which is as advantageous as possible and has as high a strength as possible in combination with as long a duration of stability as possible of the accelerator.

According to the invention, this is achieved by the features of the first claim.

The advantages of the invention are, inter alia, that a high stability, i.e. stabilization of the accelerator solution, is achieved by the accelerators according to the invention and that high strengths are achieved in the first hours and days. Moreover, the accelerator according to the invention is more advantageous than conventional accelerators.

Further advantageous configurations of the invention are evident from the description and the subclaims.

DESCRIPTION OF THE PREFERRED EMBODIMENTS

Solidification and hardening accelerators according to the invention for hydraulic binders are fluoride-free and comprise sulfate, aluminum and from 1 to 16% by weight of organic acid, based on the total weight of the accelerator, the molar ratio of aluminum to sulfate being less than 0.83. Such accelerators can be prepared in various ways. The accelerator is preferably a water-based accelerator which can occur as a solution, with finely dispersed particles in some cases, or as a dispersion.

The accelerator according to the invention is alkali- and chloride-free. An alkali- and chloride-free accelerator is usually understood in construction chemistry as meaning an accelerator which has less than 1% by weight of alkali or alkali metal or chloride ions, based on the weight of the accelerator. Moreover, a preferred accelerator according to the invention preferably contains no mineral acid.

Such a fluoride-free solidification and hardening accelerator according to the invention advantageously comprises:

from 17 to 35% by weight of sulfate,
from 3.2 to 9.5% by weight of aluminum (or from 6 to 18% of $Al_2O_3$)
from 1 to 16% by weight of organic acid,
from 0 to 6% by weight of magnesium,
from 0 to 10% by weight of alkanolamine,
from 0 to 5% by weight of a further divalent or higher-valent metal sulfate,
from 0 to 5% by weight of plasticizers,
from 0 to 35% by weight of silicon dioxide,
from 0 to 8% by weight of glycerol,
and water, the molar ratio of aluminum to sulfate being less than 0.83.

The abovementioned substances are advantageously encountered as ions in solution but may also occur in complexed form or undissolved in the accelerator. This is the case in particular if the accelerator occurs as a solution having finely dispersed particles in some cases or as a dispersion.

In a preferred embodiment, the accelerator according to the invention comprises from 17 to 35% by weight of sulfate, from 3.2 to 9.5% by weight of aluminum and from 1 to 10% by weight of organic acid. Even more preferable is an accelerator comprising from 24 to 29% by weight, preferably from 24.5 to 27% by weight, even more preferably from 24.95 to 27% by weight, of sulfate, from 4 to 6.5% by weight of aluminum and from 2 to 8% by weight of organic acid, based on the total weight of the accelerator.

A particularly suitable accelerator comprises magnesium, preferably in an amount of from 0.01 to 6% by weight, in particular from 0.4 to 3.1% by weight, based on the total weight of the accelerator.

Furthermore, the accelerator according to the invention may additionally comprise glycerol, preferably in an amount of from 0.1 to 8% by weight, in particular from 2 to 4% by weight, based on the total weight of the accelerator.

A fluoride-free solidification and hardening accelerator according to the invention for hydraulic binders can be prepared, for example, from at least 40 to 60% by weight of aluminum sulfate ($Al_2(SO_4)_3.14H_2O$) and from 1 to 16% by weight of organic acid, based on the total weight of the accelerator, the molar ratio of aluminum to sulfate being less than 0.83.

The aluminum sulfate used for the preparation may contain a different amount of water of crystallization. The typically used aluminum sulfate is aluminum sulfate tetradecahydrate ($Al_2(SO_4)_3.14H_2O$). It is usually also referred to as 17% aluminum sulfate because it contains 17% of $Al_2O_3$. The quantity data mentioned in this present document in relation to aluminum sulfate are based on $Al_2(SO_4)_3.14H_2O$. If the aluminum sulfate contains different amounts of water of crystallization, the amounts of aluminum sulfate which are required for the present invention can easily be calculated. Thus, from 40 to 60% by weight of $Al_2(SO_4)_3.14H_2O$ would correspond to an amount of from 23 to 35% by weight of anhydrous $Al_2(SO_4)_3$.

Aluminum sulfate can also be produced by a reaction of aluminum hydroxide with sulfuric acid during the preparation of the accelerator, sulfate ions accordingly forming in the aqueous solution. In general, aluminum sulfate can be produced by a reaction of a basic aluminum compound with sulfuric acid.

In a preferred embodiment, at least from 45 to 55% by weight of aluminum sulfate ($Al_2(SO_4)_3.14H_2O$) is used in the preparation of the accelerator according to the invention. An amount of more than 50% by weight is even more preferable. Particularly good results are obtained with from 51 to 55% by weight, in particular with from 51 to 53% by weight, of aluminum sulfate ($Al_2(SO_4)_3.14H_2O$), based in each case on the total weight of the accelerator.

The molar ratio of aluminum to sulfate must in every case be less than 0.83. The molar ratio of aluminum to sulfate is preferably less than 0.80, particularly preferably less than 0.7.

The molar ratio of aluminum to organic acid is preferably greater than 0.67. A molar ratio of aluminum to organic acid of more than 1 is particularly preferred.

The organic acid used is preferably a carboxylic acid, particularly preferably a monocarboxylic acid. Formic acid is particularly preferred but it is also possible to use other organic acids having the same effect, such as, for example, acetic acid. Preferably, the acid is used in an amount of from 1 to 16% by weight, preferably from 1 to 10% by weight, even more preferably from 2 to 7% by weight, based on the total weight of the accelerator.

The accelerator according to the invention can be particularly advantageously prepared since, in a particularly preferred embodiment, it can be prepared without the expensive aluminum hydroxide $Al(OH)_3$ and is therefore free of aluminum hydroxide.

Preferably aluminum hydroxide is used in an amount of less than 5% by weight, in particular from 0 to 3% by weight, even more preferably of less than 1% by weight, based on the total weight of the accelerator, in the preparation. The aluminum hydroxide can be used in amorphous or crystalline form. Amorphous aluminum hydroxide is advantageously used. The aluminum hydroxide can also be used in the form of basic aluminum carbonate, aluminum hydroxysulfate or the like.

Advantageously, no aluminum hydroxide is used for the preparation of the accelerator according to the invention.

In order to obtain accelerators having a long shelf-life, magnesium hydroxide $Mg(OH)_2$ is additionally used for the preparation, preferably in an amount of from 0.1 to 10% by weight, in particular from 1 to 5% by weight, based on the total weight of the accelerator. Instead of the magnesium hydroxide, it is also possible to use the corresponding amount of another magnesium compound, in particular of a magnesium salt or oxide, for example magnesium oxide MgO, magnesium oxyhydroxide or magnesium carbonate.

The accelerator according to the invention may additionally contain alkanolamine in the preparation, preferably in an amount of 0.1-10% by weight, based on the total weight of the accelerator. An advantageously used alkanolamine is diethanolamine DEA.

In addition, at least one further divalent or higher-valent metal sulfate can be used for the preparation of the accelerator according to the invention, preferably in an amount of 0.1-5% by weight, based on the total weight of the accelerator. Manganese(II) sulfate is particularly preferred as the further metal sulfate. Iron sulfate is likewise suitable.

Stable accelerators and good results are also obtained with an accelerator according to the invention which additionally comprises silicic acid.

In the entire present document, the term "silicic acid" is understood as meaning a silicic acid which includes not only ortho-silicic acid but also all forms of silicon dioxide, i.e. the anhydride of ortho-silicic acid, silicon dioxide itself, as well as colloidal, precipitated or pyrogenic silicic acid or silica fume. The silicic acid used in the accelerator according to the invention therefore preferably is or contains colloidal, precipitated, pyrogenic silicic acid or microsilicic acid (silica fume) or a mixture thereof. Examples of particularly suitable silicic acids are colloidal silicic acid, silica fume, Aerosil® or Sipernat®. The silicic acid which is particularly suitable for the present invention has compact or porous particles, typically having a specific surface area of 50-1000 $m^2/g$, in particular from 80 to 500 $m^2/g$, and a particle size in the range from 4 to 1000 nm, in particular from 7 to 500 nm. Colloidal silicic acid particles, so-called nanoparticles, are particularly preferred. The silicic acid particles used in the accelerator according to the invention may have a different size distribution. Thus, for example, small and large silicic acid particles may be present together in the accelerator. The silicic acid particles suitable for the present invention may also be waste products which are obtained, for example, by chemical-mechanical polishing (CMP) of silicon dioxide products. The surface of the silicic acid particles may also have been chemically modified.

The content of silicon dioxide or the solids content of the silicic acid, based on the total weight of the accelerator, is preferably from 0.1 to 40% by weight, preferably from 1 to 30% by weight, even more preferably from 3 to 20% by weight, in particular from 6 to 15% by weight.

The silicic acid is preferably present as a silicic acid dispersion and contains silicic acid particles. The liquid medium used is in particular water. Silica sol is particularly preferred as the silicic acid dispersion. The silica sol preferably contains colloidal silicic acid, in particular amorphous colloidal silicic acid, having a particle size in the range from 4 to 1000 nm, in particular from 7 to 500 nm. Typically, the silica sol has a specific surface area of 50-700 $m^2/g$, in particular from 80 to 500 $m^2/g$. A dispersion comprising silica fume is likewise particularly suitable as the silicic acid dispersion.

The accelerator according to the invention preferably comprises a silica sol having a silicon dioxide content, based on the total weight of the silica sol, of from 1 to 60% by weight, in particular from 5 to 50% by weight, even more preferably from 10 to 40% by weight.

The proportion of the silicic acid dispersion, in particular of silica sol, in the accelerator is preferably from 0.1 to 60% by weight, in particular from 5 to 55% by weight, based on the total weight of the accelerator. Particularly preferred are accelerators which have a proportion of silica sol or of silica fume dispersion of more than 20% by weight, in particular having a proportion of from 23 to 55% by weight, even more preferably having a proportion of from 25 to 40% by weight.

The accelerator according to the invention may additionally comprise plasticizers, in particular polycarboxylates, or stabilizers.

Of course, the accelerator according to the invention may comprise further suitable admixtures known to the person skilled in the art. However, it preferably contains no further thickeners or thixotropic agents.

A preferred fluoride-free solidification and hardening accelerator according to the invention can be prepared from (in % by weight, based in each case on the total weight of the accelerator):
- 40-60% by weight of aluminum sulfate ($Al_2(SO_4)_3 \cdot 14H_2O$),
- 1-16% by weight of organic acid,
- 0 to less than 5% by weight of aluminum hydroxide ($Al(OH)_3$),
- 0.1-10% by weight of magnesium hydroxide,
- 0-10% by weight of alkanolamine,
- 0-5% by weight of a further divalent or higher-valent metal sulfate,
- 0-35% by weight of silicon dioxide,
- 0-8% by weight of glycerol,
- 0-5% by weight of plasticizer,
- remaining amount water, a molar ratio of aluminum to sulfate being less than 0.83.

For the preparation of particularly advantageous solidification and hardening accelerators, substantially the following are used (in % by weight):
- 45-55% by weight of aluminum sulfate ($Al_2(SO_4)_3 \cdot 14H_2O$), preferably 51-55% by weight,
- 1-10% by weight of organic acid, in particular 2-7% by weight,
- 0-3% by weight of aluminum hydroxide ($Al(OH)_3$), in particular 0-2% by weight,
- 1-5% by weight of magnesium hydroxide,
- 1-3% by weight of alkanolamine,
- 1-3% by weight of a further divalent or higher-valent metal sulfate, in particular manganese sulfate,
- 0-20% by weight of silicon dioxide,
- 2-4% by weight of glycerol,
- 0-3% by weight of plasticizer,
- remaining amount water, a molar ratio of aluminum to sulfate less than 0.8, preferably less than 0.7.

If the silicon dioxide is present, for example, as a silicic acid dispersion, in particular a silica sol, the water can be completely initially introduced in the silicic acid dispersion and there is no need to use additional water in the preparation of the accelerator.

In comparison with conventional solidification accelerators, the amount of aluminum sulfate used in the preparation is increased and the amount of the acid used and in particular of the aluminum hydroxide is reduced. It is even possible to prepare an accelerator free of aluminum hydroxide, which leads to a particularly advantageous accelerator. Particularly good results are also obtained with an accelerator which contains a small amount of aluminum hydroxide, in particular less than 1% by weight. Preferably, up to 10% of magnesium hydroxide and/or a corresponding amount of magnesium oxide are used in the preparation of the accelerator. The amount of pure Mg, based on the total amount of accelerator, is from 0 to 6% by weight, preferably from 0.4 to 4.2% by weight, even more preferably from 0.8 to 2.9% by weight, in particular from 1.3 to 2.1% by weight.

The ratio of aluminum to sulfate is adjusted by the increased sulfate content and lower aluminum content to a value of less than 0.83, preferably less than 0.8, in particular less than 0.7.

The sulfate stability is promoted because the amount of aluminum used in the preparation is reduced by up to 25%. This is an advantage compared with conventional accelerators, where the sulfate stability is drastically adversely affected by the accelerator. The reduction in the sulfate stability by introduction of aluminum is caused in particular by virtue of the fact that the aluminate phases have a particular affinity for sulfate. The additional aluminum increases the proportion of aluminate phases in the concrete, which then give rise to a not insignificant crystallization pressure on external action of sulfate on the hardened concrete due to ettringite formation and thus lead to damage. The aluminum content, stated as $Al_2O_3$, is therefore chosen to be preferably less than 14%, particularly preferably less than 13% and in particular less than 12% of $Al_2O_3$.

If magnesium hydroxide and/or magnesium oxide is used in the preparation of the accelerator, the temperature of the mixture increases as a result of the strong reaction of the magnesium hydroxide and/or magnesium oxide with the organic acid to such an extent that the water for these batches need not be heated. The further components are then added to this heated mixture. However, the components can also be added in another arbitrary sequence. This simplifies the process and less energy is required. An additional advantage of the use of magnesium is the substantially longer shelf-life of the accelerators which is brought about by the magnesium ions. At a content of only 1% by weight of magnesium hydroxide in the preparation, a good shelf-life is achieved. At higher contents, the shelf-life is at least three months. In addition, the stability of the accelerators is positively influenced by the reduced amount of aluminum. The sulfate stability, too, is increased by the reduced amount of aluminum or the reduced ratio of aluminum to sulfate.

The development of the compressive strength of the air-placed concrete in the first hours and days is also very positively influenced and is better than in the case of conventionally used accelerators.

The accelerators according to the invention may be present, for example, as a solution or dispersion or in pulverulent form, it being preferable if an accelerator present as a powder is dissolved or dispersed in water before use.

The present invention furthermore relates to a process for accelerating the solidification and hardening of hydraulic binders and mortar or concrete produced therefrom, characterized in that a fluoride-free solidification and hardening accelerator according to the invention is added in an amount of from 0.1 to 15% by weight, in particular from 1 to 10% by weight, based on the weight of the hydraulic binder, to the mixture which contains hydraulic binders.

The accelerator according to the invention can be used for accelerating the setting and hardening of hydraulic binders, hydraulic binders mixed with latently hydraulic binders or inert fillers, mortar or concrete. A preferred use is in pneumatically applied mortar or air-placed concrete after the dry or wet spraying process, the accelerator being added to or metered into the binder, mortar or concrete in dry form or mixed with water, in the transport pipe, the prewetting nozzle or the spray nozzle, directly into the mixture or into the mixing water. Preferably, an accelerator in the form of a solution or dispersion is metered by means of a liquid metering device, and a pulverulent accelerator by means of a powder metering device.

Examples of binders whose hardening and setting can be accelerated by the accelerator according to the invention or the process are cement, such as mixed cements, lime, hydraulic lime and gypsum, in each case alone or as a mixture with latently hydraulic binders or inert fillers, and examples of mixtures which contain these binders are mortar and concrete, in particular pneumatically applied mortar and air-placed concrete.

The present invention furthermore relates to a hardenable or hardened mixture which contains binder and which contains the accelerator according to the invention, in particular pneumatically applied mortar and air-placed concrete containing the accelerator according to the invention.

By using the solidification and hardening accelerators according to the invention, extremely rapid setting of the corresponding binders or of the mixtures which contain such binders is effected, and high initial and final strengths are achieved. The setting and hardening accelerators do not have a corrosive or toxic effect either on the processor or on the environment.

Working Examples

A plurality of samples of accelerators according to the invention were prepared according to the values stated in Table 1, aluminum sulfate with 17% of $Al_2O_3$, 85% strength formic acid, silica sol with 30% by weight of silica particles, based on the weight of the silica sol, and amorphous aluminum hydroxide as aluminum hydroxide being used, and were compared with a comparative example without acid (B1), a comparative example with more than 16% by weight of acid (B3) and a conventional accelerator (B2). The conventional accelerator (B2) used was Gecedral® F2000W (obtainable from BK Giulini GmbH).

For the preparation of the accelerators with magnesium hydroxide, unheated water was initially introduced. The magnesium hydroxide was suspended therein and formic acid was added with the result that the temperature increased. Thereafter, the aluminum sulfate, the aluminum hydroxide if present, and the manganese sulfate or the iron sulfate were added and dissolved at elevated temperature. Finally, if present, the glycerol and diethanolamine DEA were added. The whole was then stirred until the reaction had abated and the temperature had fallen to about 40° C. after about one hour. A solution which, depending on composition, may also have finely dispersed particles forms.

For the preparation of the accelerator without magnesium hydroxide, preheated water was initially introduced. The formic acid was added to the water and optionally the aluminum hydroxide was then added. Thereafter, the aluminum sulfate, the manganese sulfate or the iron sulfate, the glycerol and diethanolamine were added. The whole was then stirred until the reaction had abated.

Table 2 shows the molar ratios of aluminum to sulfate and of aluminum to the organic acid, in this case formic acid, of the measured samples. The values of the molar ratios of aluminum to the organic acid are above 0.67 and the values of the molar ratios of aluminum to sulfate are below 0.83. Furthermore, the aluminum content of the various examples is stated.

TABLE 2

| | Molar ratios | | | |
|---|---|---|---|---|
| Example | Al/Sulfate | Al/Acid | % Al | % $Al_2O_3$ |
| A1 | 0.75 | 1.86 | 5.30 | 10.02 |
| A2 | 0.75 | 1.86 | 5.30 | 10.02 |

TABLE 1

Sample composition in % by weight

| No. | $H_2O$ | $Al(OH)_3$ (amorphous) | $Al_2(SO_4)_3 \cdot 14H_2O$ | HCOOH (85%) | $MnSO_4 \cdot 1H_2O$ | Glycerol (86.5%) | DEA (90%) | $Fe_2(SO_4)_3 \cdot 9H_2O$ | Mg—$(OH)_2$ | Silica sol |
|---|---|---|---|---|---|---|---|---|---|---|
| A1 | 35.94 | 2.5 | 51.7 | 5.7 | — | 2.16 | 2 | — | — | — |
| A2 | 32.34 | 2.5 | 51.7 | 5.7 | — | 2.16 | 2 | — | 3.6 | — |
| A3 | 34.5 | 2.5 | 51.7 | 5.7 | — | — | 2 | — | 3.6 | — |
| A4 | 36.89 | — | 51.5 | 5 | 1.7 | 2.16 | 2.75 | — | — | — |
| A5 | 32.69 | — | 51.5 | 5 | 1.7 | 2.16 | 2.75 | — | 4.2 | — |
| A6 | 34.85 | — | 51.5 | 5 | 1.7 | — | 2.75 | — | 4.2 | — |
| A7 | 33 | 2.25 | 50.5 | 6 | — | 2.5 | 2 | 1 | 2.75 | — |
| A8 | 32 | — | 51 | 7 | — | 2.5 | 3.5 | 1.25 | 2.75 | — |
| A9 | 48.5 | — | 40 | 5 | — | — | 3 | — | 3.5 | — |
| A10 | 43.5 | — | 45 | 5 | — | — | 3 | — | 3.5 | — |
| A11 | 38.5 | — | 50 | 5 | — | — | 3 | — | 3.5 | — |
| A12 | 37 | — | 51.5 | 5 | — | — | 3 | — | 3.5 | — |
| A13 | 35.5 | — | 53 | 5 | — | — | 3 | — | 3.5 | — |
| A14 | 33.5 | — | 55 | 5 | — | — | 3 | — | 3.5 | — |
| A15 | 28.5 | — | 60 | 5 | — | — | 3 | — | 3.5 | — |
| A16 | 40 | — | 51.5 | 2 | — | — | 3 | — | 3.5 | — |
| A17 | 34 | — | 51.5 | 8 | — | — | 3 | — | 3.5 | — |
| A18 | 27 | — | 51.5 | 14 | — | — | 3 | — | 4.5 | — |
| A19 | 40.5 | — | 51.5 | 5 | — | — | 3 | — | — | — |
| A20 | 36 | — | 51.5 | 5 | — | — | 3 | — | 4.5 | — |
| A21 | 35 | — | 51.5 | 5 | — | — | 3 | — | 5.5 | — |
| A22 | 34.5 | — | 51.5 | 5 | — | — | 5.5 | — | 3.5 | — |
| A23 | 40 | — | 51.5 | 5 | — | — | — | — | 3.5 | — |
| A24 | 35 | 2 | 51.5 | 5 | — | — | 3 | — | 3.5 | — |
| A25 | 33 | 4 | 51.5 | 5 | — | — | 3 | — | 3.5 | — |
| A26 | 34 | — | 51.5 | 5 | 3 | — | 3 | — | 3.5 | — |
| A27 | 7 | — | 51.5 | 5 | — | — | 3 | — | 3.5 | 30 |
| A28 | 4 | — | 51.5 | 8 | — | — | 3 | — | 3.5 | 30 |
| A29 | 37.25 | 0.25 | 51 | 5 | — | — | 3 | — | 3.5 | — |
| A30 | 36.75 | 0.75 | 51 | 5 | — | — | 3 | — | 3.5 | — |
| B1 | 41.64 | 2.5 | 51.7 | — | — | 2.16 | 2 | — | — | — |
| B3 | 22 | — | 51.5 | 20 | — | — | 3 | — | 3.5 | — |

TABLE 2-continued

Molar ratios

| Example | Al/Sulfate | Al/Acid | % Al | % Al$_2$O$_3$ |
|---|---|---|---|---|
| A3 | 0.75 | 1.86 | 5.30 | 10.02 |
| A4 | 0.64 | 1.86 | 4.64 | 8.76 |
| A5 | 0.64 | 1.86 | 4.64 | 8.76 |
| A6 | 0.64 | 1.86 | 4.64 | 8.76 |
| A7 | 0.75 | 1.71 | 5.13 | 9.69 |
| A8 | 0.66 | 1.31 | 4.59 | 8.67 |
| A9 | 0.66 | 1.44 | 3.60 | 6.80 |
| A10 | 0.66 | 1.62 | 4.05 | 7.68 |
| A11 | 0.66 | 1.80 | 4.50 | 8.50 |
| A12 | 0.66 | 1.86 | 4.64 | 8.76 |
| A13 | 0.66 | 1.91 | 4.77 | 9.01 |
| A14 | 0.66 | 1.98 | 4.95 | 9.35 |
| A15 | 0.66 | 2.16 | 5.40 | 10.20 |
| A16 | 0.66 | 4.65 | 4.64 | 8.76 |
| A17 | 0.66 | 1.16 | 4.64 | 8.76 |
| A18 | 0.66 | 0.52 | 4.64 | 8.76 |
| A19 | 0.66 | 1.86 | 4.64 | 8.76 |
| A20 | 0.66 | 1.86 | 4.64 | 8.76 |
| A21 | 0.66 | 1.86 | 4.64 | 8.76 |
| A22 | 0.66 | 1.86 | 4.64 | 8.76 |
| A23 | 0.66 | 1.86 | 4.64 | 8.76 |
| A24 | 0.73 | 2.07 | 5.16 | 9.74 |
| A25 | 0.81 | 2.27 | 5.68 | 10.72 |
| A26 | 0.62 | 1.86 | 4.64 | 8.76 |
| A27 | 0.66 | 1.86 | 4.64 | 8.76 |
| A28 | 0.66 | 1.16 | 4.64 | 8.76 |
| A29 | 0.67 | 1.86 | 4.66 | 8.79 |
| A30 | 0.67 | 1.92 | 4.79 | 9.04 |
| B1 | 0.75 | — | 5.30 | 10.02 |
| B2 | 1.40 | 1.18 | 7.85 | 14.83 |
| B3 | 0.66 | 0.46 | 4.64 | 8.76 |

From 0.1 to 15% by weight, in particular from 1 to 10% by weight, of the accelerator according to the invention can be added to hydraulic binders.

For the determination of the efficiency of the accelerator according to the invention, according to examples A1 to A30, and of comparative examples B1, B2 and B3, in each case 6% of the accelerator, based on the content of the hydraulic binder, was mixed with a mortar mixture (particle size 0-2.2 mm, w/c=0.48 and 1.0% of Sika® ViscoCrete® SC305 (obtainable from Sika Schweiz AG)). The hydraulic binder used was Portland cement. The test was effected by means of a needle penetrometer (Mecmesin BFG500) and on prisms (40×40×160 mm). The compressive strength of the prisms was determined by means of a hydraulic press (Table 3).

TABLE 3

Strengths in MPa and shelf-life in days; in the case of examples A1 to A8 and B1 and B2, the shelf-life was not measured. In the case of comparative example B3, the strength could not be measured since the accelerator precipitated out in the preparation.

| Example | Strength after 6 hours | Strength after one day | Strength after seven days | Stability (days) |
|---|---|---|---|---|
| A1 | 1.7 | 21.9 | 35.2 | — |
| A2 | 2.1 | 20.8 | 33.6 | — |
| A3 | 2.2 | 22.7 | 33.4 | — |
| A4 | 1.3 | 22.4 | 33.9 | — |
| A5 | 1.9 | 21.7 | 34.2 | — |
| A6 | 2 | 22.3 | 33.8 | — |
| A7 | 2.5 | 20.8 | 42 | — |
| A8 | 2.3 | 22.3 | 43.8 | — |
| A9 | 1.4 | 19.1 | 40.9 | >90 |
| A10 | 1.4 | 19.1 | 41.6 | >90 |
| A11 | 1.7 | 20.2 | 43.1 | >90 |
| A12 | 1.7 | 20.7 | 45 | >90 |
| A13 | 1.8 | 20 | 44.4 | >90 |
| A14 | 2 | 19.7 | 42.1 | >90 |
| A15 | 2.1 | 20.2 | 44.8 | 30 |
| A16 | 1.8 | 20.1 | 42.3 | 55 |
| A17 | 1.6 | 18 | 39.2 | 28 |
| A18 | 1.4 | 18.6 | 43.3 | 7 |
| A19 | 1 | 23.4 | 48.8 | 1 |
| A20 | 1.6 | 20.5 | 43.1 | >90 |
| A21 | 1.6 | 20.3 | 40.6 | >90 |
| A22 | 1.5 | 19.4 | 41.6 | >90 |
| A23 | 1.3 | 16.4 | 37.7 | 80 |
| A24 | 1.9 | 19.4 | 41.9 | 89 |
| A25 | 2 | 18.7 | 39.8 | 32 |
| A26 | 1.6 | 20.1 | 42.0 | 13 |
| A27 | 1.1 | 20.5 | 41.4 | >90 |
| A28 | 1.5 | 20.6 | 42.6 | >90 |
| A29 | 1.7 | 19.6 | 42.1 | >90 |
| A30 | 1.7 | 19.4 | 42.1 | >90 |
| B1 | 1.4 | 18.9 | 33.5 | — |
| B2 | 2.1 | 10.1 | 30.8 | — |
| B3 | — | — | — | precipitated |

Surprisingly, it has been found that the strengths after a few hours to a few days are better than in the case of conventionally known accelerators, owing to the high proportions of aluminum sulfate and magnesium, in spite of the reduced aluminum hydroxide content or absence of aluminum hydroxide and the reduced proportion of acid (cf. Table 3). Particularly good results were obtained with accelerators which are free of aluminum hydroxide. The more aluminum hydroxide present in the accelerator, the more the strengths after 1 or after 7 days decrease. In addition, the shelf-life also decreases (cf. examples A24 and A25, and A29 and A30).

Accelerators comprising magnesium hydroxide are particularly suitable. It was possible thereby to obtain accelerators having a particularly good shelf-life, whereas accelerators without magnesium hydroxide have good strength values but precipitated after only a few days (cf. example A19).

It has also been found that a suitable accelerator contains less than 16% by weight, in particular less than 10% by weight, of formic acid, based on the total weight of the accelerator. Comparative example B3, which with 17% by weight of formic acid (or 20% by weight of an 85% strength formic acid) contains more than 16% by weight of formic acid, precipitated out in the preparation and could not be used as an accelerator. Comparative example B1 without acid shows in particular less good early strength values after 6 hours or 1 day compared with the accelerators according to the invention. Example A18 with 11.9% by weight of formic acid (or 14% by weight of an 85% strength formic acid) shows good strength values but was stable for only about 1 week. Particularly good results were obtained with an accelerator which contained from 1 to 7% by weight of formic acid, even better from 2 to 6% by weight of formic acid. Thus, examples A16 and A17 with 1.7% by weight (or 2% by weight of an 85% strength formic acid) or 6.8% by weight of formic acid (or 8% by weight of an 85% strength formic acid) show good strength values. An accelerator which contains 4.25% by weight of formic acid (or 5% by weight of an 85% strength formic acid) is particularly suitable (cf. example A9). This shows not only good strength values but also an excellent shelf-life of more than 3 months.

The additional use of silica sol in the accelerator results in the accelerator both having good strength values (example A27) and additionally having a better shelf-life (cf. in particular example A28 compared with A17).

Of course, the invention is not limited to the working examples shown and described.

The invention claimed is:

1. A fluoride-free solidification and hardening accelerator for hydraulic binders, comprising:
   sulfate;
   aluminum; and
   from 1 to 16% by weight of organic acid, based on the total weight of the accelerator,
   wherein
   the molar ratio of aluminum to sulfate is less than 0.83, and
   the molar ratio of aluminum to the organic acid is from greater than 0.67 to 4.65.

2. The accelerator as claimed in claim 1, wherein it comprises from 17 to 35% by weight of sulfate, from 3.2 to 9.5% by weight of aluminum and from 1 to 10% by weight of organic acid, based on the total weight of the accelerator.

3. The accelerator as claimed in claim 1, wherein the accelerator is free of aluminum hydroxide.

4. The fluoride-free solidification and hardening accelerator for hydraulic binders as claimed in claim 1, which can be prepared from at least 40 to 60% by weight of aluminum sulfate ($Al_2(SO_4)_3.14H_2O$) and from 1 to 16% by weight of organic acid, based on the total weight of the accelerator, the molar ratio of aluminum to sulfate being less than 0.83.

5. The accelerator as claimed in claim 4, wherein at least 45 to 55% by weight of aluminum sulfate ($Al_2(SO_4)_3.14H_2O$) and from 1 to 10% by weight of organic acid, based in each case on the total weight of the accelerator, are used in the preparation.

6. The accelerator as claimed in claim 4, wherein at least 51 to 55% by weight of aluminum sulfate ($Al_2(SO_4)_3.14H_2O$), based on the total weight of the accelerator, are present in the preparation.

7. The accelerator as claimed in claim 1, wherein in addition from 0.1 to 10% by weight of magnesium hydroxide or the corresponding amount of another magnesium salt, based on the total weight of the accelerator, is present in the preparation.

8. The accelerator as claimed in claim 1, wherein the molar ratio of aluminum to sulfate is less than 0.80.

9. The accelerator as claimed in claim 1, wherein 0.1-5% by weight of at least one further divalent or higher-valent metal sulfate is present in the preparation.

10. The accelerator as claimed in claim 1, wherein the organic acid is formic acid.

11. The accelerator as claimed in claim 1, wherein the accelerator comprises silicic acid or silica fume or a mixture thereof.

12. A process for accelerating the solidification and hardening of hydraulic binders and mortar or concrete produced therefrom, wherein a fluoride-free solidification and hardening accelerator as claimed in claim 1 is added in an amount of from 0.1 to 15% by weight, based on the weight of the hydraulic binder, to a mixture which contains hydraulic binders.

13. An accelerator in an air-placed concrete or pneumatically applied mortar comprising the accelerator as claimed in claim 1.

14. A mixture containing binder, wherein it contains the accelerator as claimed in claim 1.

* * * * *